United States Patent [19]

Johnston et al.

[11] 3,791,018

[45] Feb. 12, 1974

[54] HEATING METHOD AND APPARATUS FOR SECURING A MEMBER TO AN ARTICLE

[75] Inventors: Walter K. Johnston, Denver; Gary G. Seaman, Broomfield, both of Colo.

[73] Assignee: Western Electric Company, Incorporated, New York, N.Y.

[22] Filed: Nov. 16, 1971

[21] Appl. No.: 199,260

[52] U.S. Cl. .................... 29/471.1, 29/493, 29/498, 29/628, 228/6, 228/51

[51] Int. Cl. .............................................. B23k 31/02

[58] Field of Search .......... 29/498, 471.1, 628, 493; 228/6, 51

[56] References Cited

UNITED STATES PATENTS

| | | | |
|---|---|---|---|
| 2,960,419 | 11/1960 | Emeis | 29/493 |
| 2,979,808 | 4/1961 | Booth | 29/493 X |
| 3,382,564 | 5/1968 | Gollentine | 29/471.1 |
| 3,384,958 | 5/1968 | Christian et al. | 29/498 X |
| 3,403,242 | 9/1968 | Cropp et al. | 219/85 |
| 3,551,127 | 12/1970 | Stoll | 29/498 X |
| 3,617,682 | 11/1971 | Holl | 29/498 X |
| 3,664,016 | 5/1972 | Seve et al. | 92/628 X |
| 3,680,198 | 8/1972 | Wood | 29/498 |

*Primary Examiner*—Robert D. Baldwin
*Assistant Examiner*—Ronald J. Shore
*Attorney, Agent, or Firm*—D. D. Bosben

[57] ABSTRACT

Resilient leads of an integrated circuit module are reflow soldered to circuit paths on one side of a printed wiring board having component leads protruding from its opposite side. Apparatus for accomplishing the reflow soldering includes a plurality of vertically movable metal pins, one for each lead, and a heater block which is maintained at a constant temperature. When the pins are in upper positions, lower end portions thereof are disposed in apertures in the heater block, whereby discrete quantities of heat flow from the heater block into the lower end portions. The pins then are moved downward through the apertures in the heater block so that their lower ends engage their respective leads, whereby the heat in their lower end portions melts the solder on the leads momentarily. The pins, which are individually biased, then hold the leads in bonding position until the melted solder has cooled and solidified to bond the leads to the circuit paths. Uniform support of the side of the printed wiring board from which the component leads protrude is achieved by placing it on a bed of loosely constrained, spherical members. A modified from of the apparatus may be used to secure a member to an article by staking.

15 Claims, 14 Drawing Figures

Patented Feb. 12, 1974 | 3,791,018

4 Sheets-Sheet 1

INVENTORS
W. K. JOHNSTON
G. G. SEAMAN

BY D. D. Bosben
ATTORNEY

Patented Feb. 12, 1974

3,791,018

4 Sheets-Sheet 4

HEATING METHOD AND APPARATUS FOR SECURING A MEMBER TO AN ARTICLE

BACKGROUND OF THE INVENTION

1. Field of the Invention

This invention relates to a heating method and apparatus for securing a member to an article, and more particularly to the securing of a plurality of members to one side of an article having a plurality of irregular protrusions on the opposite side thereof.

2. Description of the Prior Art

A known apparatus for reflow soldering a plurality of resilient leads of an integrated circuit module to circuit paths on a printed wiring board, such as in the manufacture of circuit packs for telephone switching equipment, includes an electrically conducting member in the form of an elongated bar, which is positioned across a plurality of the leads simultaneously to press them against respective circuit paths as the bar is resistance heated by passing electric current through it from one end to the other. After a predetermined time period, which is sufficient to melt the solder on the leads, current through the bar is turned off and the solder cools and solidifies to bond the leads to the circuit paths. In this type of apparatus, since a voltage gradient exists in the bar from one end to the other, to preclude electrical damage to the integrated circuitry, the portion of the bar which engages the leads is covered with electrical insulating material, such as a metal oxide coating. In another similar apparatus, which does not require an insulative coating since the voltage potential along its length is uniform, the electrically conducting member is in the form of a U-shaped sheet-like member, the bight portion of which is positioned across a plurality of the leads simultaneously while electric current is passed from one leg of the member and through the bight portion to the other leg of the member.

These prior known systems, however, have proven unsatisfactory for various reasons. For example, in the case of the elongated bar, the current in the bar frequently causes electrical damage to the integrated circuitry despite the insulative oxide coating, as a result of the coating becoming scratched or otherwise damaged in operation. In the case of the U-shaped sheet-like member, the current usually flows through the member in a non-uniform manner, such that the heat generated in the member along its bight portion varies from one point to another, producing "hot spots" and "cold spots" along the bight portion. As a result the amount of heat which is applied to the different leads during the reflow soldering process usually is not uniform, and the solder on some leads may not be melted sufficiently, causing defective connections, while other leads are subjected to excessive heat, causing damage to the integrated circuit module and/or the printed wiring board.

These prior known apparatus also are disadvantageous in that the heated member is unable to provide uniform pressure on the leads, whereby some leads are not pressed downward into proper bonding position, because of slight irregularities in the leads, the printed wiring board or the heated member. This is further aggravated where the printed wiring board has a plurality of component leads projecting from its opposite side, since it is difficult to support the board uniformly, particularly at its interior portions, during a reflow soldering operation. The heated member also is limited as to the number of leads which it can bond at one time, and therefore is inefficient where leads on several sides of a circuit module are to be bonded to the printed wiring board.

SUMMARY OF THE INVENTION

In accordance with this invention, a member is secured to an article by producing a preselected quantity of heat, which is sufficient to melt material adjacent the member momentarily, in a heat storing means at a position removed from the member. The production of heat in the heat storing means then is interrupted and the heat storing means is engaged with the member so that the heat therein melts the material adjacent the member. The heat storing means then is maintained in pressure engagement with the member to hold it in proper position until the melted material has resolidified to secure the member to the article.

Preferably, where a plurality of members are to be secured to an article, preselected discrete quantities of heat, each of which is sufficient to melt material (such as solder) adjacent a respective one of the members momentarily, is stored at a position removed from the members and the quantities of heat then are transferred to the members simultaneously. In this regard, specific apparatus in accordance with the invention may include a heater block having a pluralarity of apertures therethrough. A mechanism is provided for controlling the temperature of the heater block at a preselected constant value and a plurality of elongated pins of heat conducting material are disposed in the apertures of the heater block. The pins are movable longitudinally in the apertures between positions in which end portions thereof are disposed in the apertures for the reception of preselected discrete quantities of heat from the heater block, and positions in which the end portions are engaged with respective ones of the members to be secured to an article, whereby the discrete quantities of heat cause momentary melting of material adjacent their respective members. The pins then remain in engagement with the members until the melted material has resolidified to secure the members to the article. Each of the pins also is individually biased into engagement with its respective member, whereby the members are urged into firm engagement with the article independently of one another and in a substantially uniform manner. Further, where the article has a plurality of irregular protrusions on its underside, uniform support of the article is achieved by placing it on a bed of loosely constrained, spherical members.

DETAILED DESCRIPTION

Figure 1:
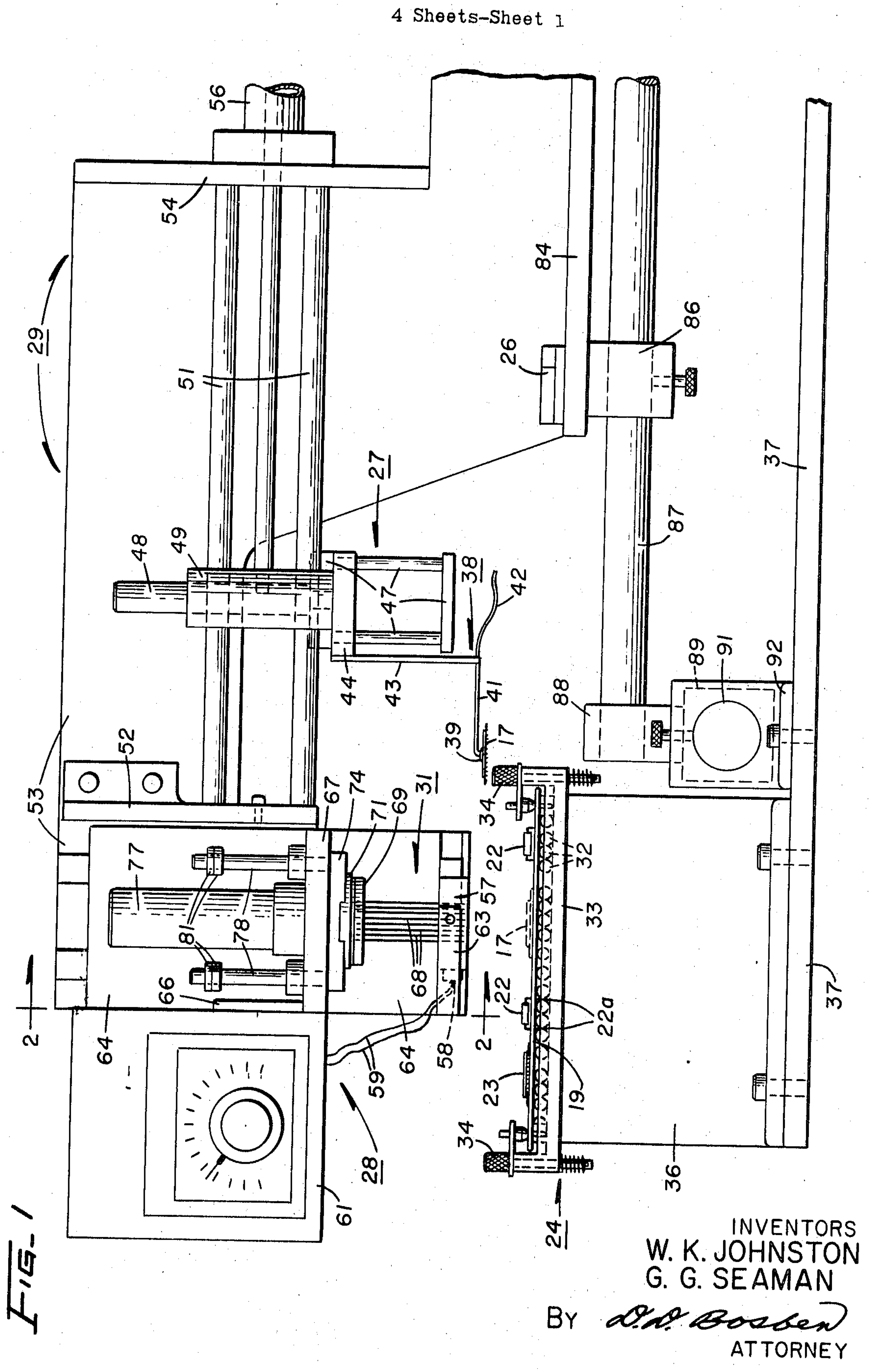
FIG. 1 is a front elevational view of apparatus in accordance with the invention in a first operating position.
Figures 2, 3, 4, 5:
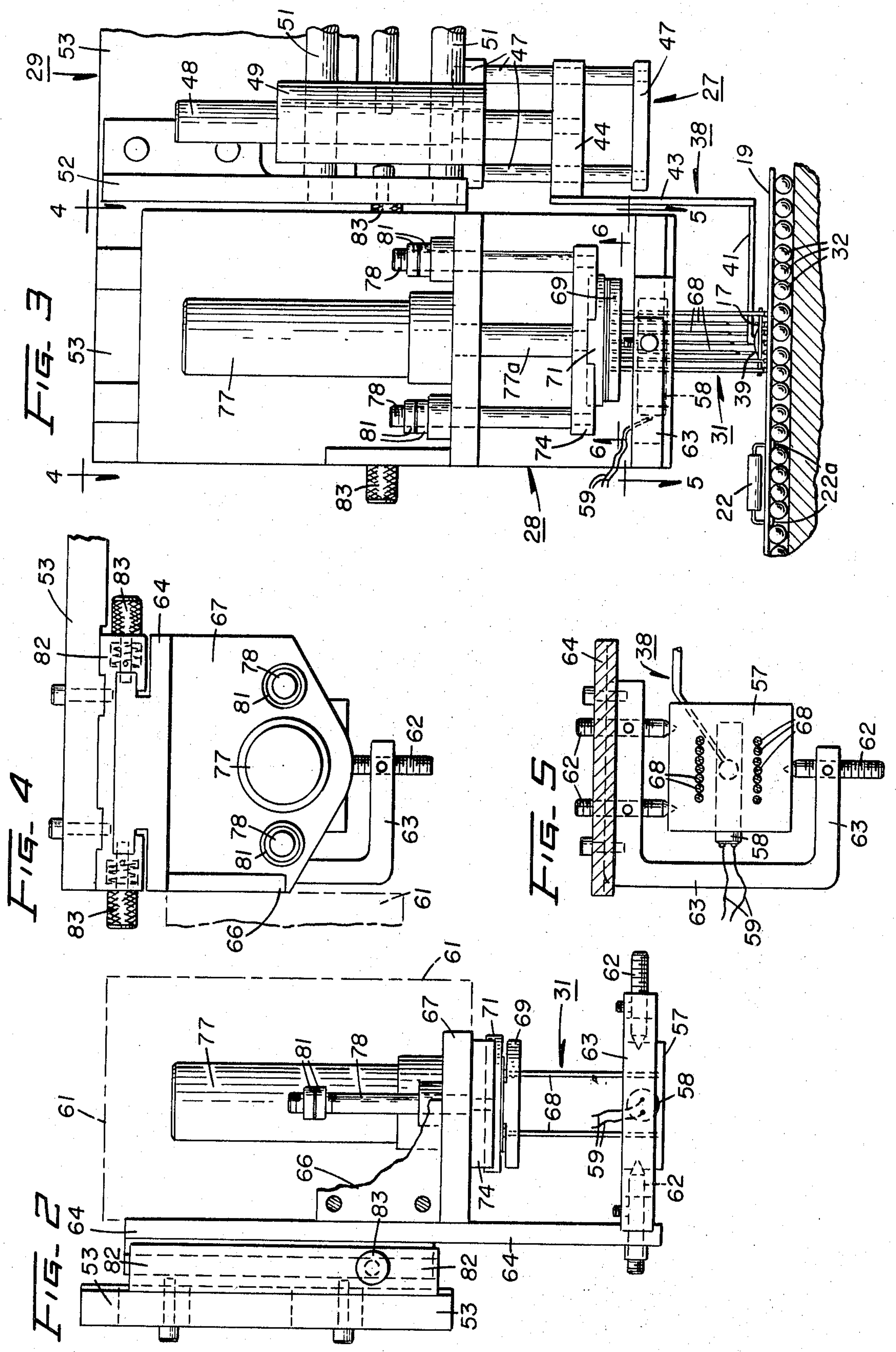
FIG. 2 is an enlarged side elevational view of a portion of the apparatus as seen along the line 2—2 in FIG. 1.
FIG. 3 is an enlarged front elevational view of a portion of the apparatus in a second operating position.
FIG. 4 is a plan view of a portion of the apparatus as seen along the line 4—4 in FIG. 3.
FIG. 5 is a cross-sectional view of the apparatus taken along the line 5—5 in FIG. 3.
Figures 9, 10A, 10B, 11:
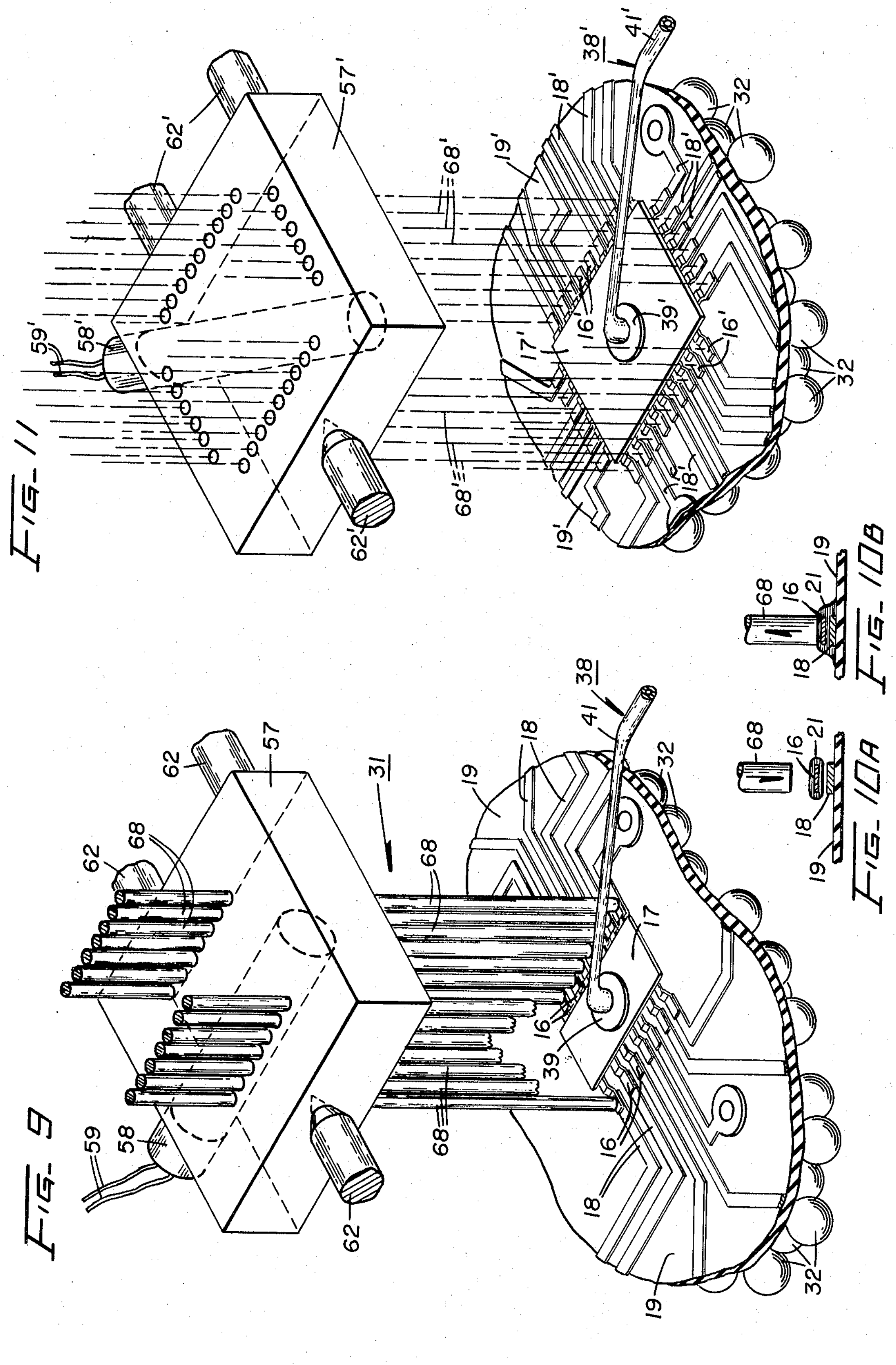
FIG. 9 is an isometric view illustrating the use of the apparatus in the reflow soldering of leads of an integrated circuit module to circuit paths on a printed wiring board.
FIGS. 10A and B are views illustrating the manner in which the apparatus accomplishes the reflow soldering of a lead to a circuit path on a printed wiring board.
FIG. 11 is an isometric view illustrating a modification of the invention.

Referring to FIG. 9, apparatus is disclosed for simultaneously bonding a set of spaced resilient projecting leads 16 of an integrated circuit module 17 to a set of leads in the form of circuit paths 18 on one side of a printed wiring board 19, the leads 16 being arranged in rows on opposite sides of the circuit module 17. In this regard, as is illustrated in FIGS. 10A and 10B, each of the leads 16 has been precoated with overlays of a heat fusible material 21, such as solder, which melts and flows upon the application of heat thereto, and which then resolidifies to bond the lead to its respective circuit path 18 in a well known manner. Referring to FIGS. 1 and 3, the one side of the printed wiring board 19 also has a plurality of electrical components 22, such as resistors, capacitors and transistors, mounted thereon and having soldered leads **22*a* extending through the board and projecting from its opposite side, whereby this side has an irregular configuration. In addition, the printed wiring board 19 may include one or more circuit modules 23** which have been bonded thereto in a previous operation.

As is best shown in FIG. 1, the disclosed apparatus includes a support assembly 24 for the printed wiring board 19, an orienting nest 26 for the integrated circuit module 17, a mechanism 27 for feeding the circuit module from the nest to the printed wiring board, and a heating unit 28 for reflow soldering the circuit module to the printed circuit board. The nest 26 preferably is of the type which includes a horizontal support surface and a pair of accurately formed vertical intersecting surfaces against which two adjacent sides of the circuit module 17 are engaged to locate it in an oriented position. The nest 26, the feed mechanism 27 and the heating unit 28 are all mounted on a main frame assembly 29 capable of adjustment in an X-Y coordinate system relative to the support assembly 24, to facilitate positioning of the nest, the feed mechanism and the heating unit relative to the specific circuit paths 18 to which the leads 16 of the circuit module 17 are to be bonded.

In a reflow soldering operation, after the printed wiring board 19 has been clamped on its support assembly 24 and the circuit module 17 has been oriented in the nest 26, the apparatus is actuated and the feed mechanism 27 transfers the circuit module from the nest into a position on the printed wiring board beneath a vertically movable pin assembly 31 of the heating unit 28, as illustrated by dashed lines in FIG. 1, and so that the leads 16 are vertically adjacent their respective circuit paths 18 on the printed wiring board, as shown in FIG. 9. The pin assembly 31 then is moved from an upper operating position, as shown in FIG. 1, to a lower operating position, as shown in FIGS. 3 and 9, in which it presses the leads 16 downward against the circuit paths 18 and transfers discrete quantities of heat into the solder 21 on respective ones of the leads, causing the solder to melt momentarily. As the melted solder 21 then cools and resolidifies to bond the leads 16 to the circuit paths 18, the pin assembly 31 remains in its lower operating position to hold the leads down in proper bonding position, after which it is returned to its upper operating position for the next cycle of operation. Automatic cycling of the apparatus in this manner may be accomplished by a suitable system of timing cams and limit switches well within the knowledge of one skilled in the art, and therefore not shown.

Referring to FIG. 1, to provide substantially uniform support for the irregular bottom of the printed wiring board 19 during the reflow soldering operation, the support assembly 24 includes a bed of loosely constrained spherical members 32, such as hardened steel balls, in a tray 33, the number of steel balls being such that they do not completely fill the tray and therefore are capable of lateral movement relative to one another within limits defined by side walls thereof. Accordingly, as the printed wiring board 19 is placed on the steel balls 32, the downwardly projecting soldered leads 22a of the electrical components 22 exert forces thereon to move them laterally into supporting engagement with the portions of the printed wiring board between the leads, whereby the steel balls support the printed wiring board substantially firmly and uniformly over its entire undersurface. The printed wiring board 19 then is held in place and urged downward against the steel balls 32 by quick-releasable, spring-biased clamping assemblies 34 adjacent the corners of the tray 33. The tray 33 is fixedly mounted on the upper ends of a pair of laterally spaced plate members 36 (only one shown) secured at their lower ends to a horizontally disposed support table 37.

As is best shown in FIG. 1, the module feeding mechanism 27 includes a vacuum pickup device 38 having a vacuum cup 39 mounted on one end of a rigid tubular member 41 which is connected at its opposite end by flexible tubing 42 to a vacuum supply, not shown. The rigid tubular member 41 is fixed to the lower end of a vertical support rod 43, which is secured at its upper end to a vertically reciprocating slide 44. The slide 44 is movable vertically on a guide rod assembly 47 by an air cylinder 48, the guide rod assembly and the air cylinder being fixedly mounted on a horizontally reciprocating slide 49 in a suitable manner.

The horizontally reciprocating slide 49 is supported on a pair of vertically spaced guide rods 51. The left-hand ends of the guide rods 51, as viewed in FIG. 1, are fixedly mounted in a forwardly projecting bracket 52 secured by suitable screws to a vertical frame plate 53 of the main frame assembly 29, and the right-hand ends of the guide rods are fixedly mounted on a forwardly projecting vertical wall member 54 secured to the vertical frame plate, such as by welding. The slide 49 is reciprocable horizontally by an air cylinder 56 mounted on the vertical wall member 54 and having a piston rod connected to the slide.

The heating unit 28 includes an apertured heater block 57 having a cartridge-type heater 58 mounted therein and connected by lead wires 59 to a heat controller 61 of any suitable type capable of maintaining the heater block at a preselected constant temperature, such as 700°F. As is best shown in FIGS. 2 and 5, the heater block 57 is supported by three adjusting screws 62 threaded through the legs of a U-shaped yoke member 63 and capable of being locked in desired positions by suitable set screws in the legs of the yoke member. The yoke member 63 is secured to the lower end of a vertical mounting plate 64 by suitable screws and the vertical mounting plate is removably mounted on the vertical frame plate 53 of the main frame assembly 29 in a manner to be described. The heat controller 61 (FIG. 1) also is fixedly mounted on the vertical mounting plate 64 by a rectangular block member 66 suitably secured at one side to the mounting plate and at its bottom to a horizontally projecting shelf 67 which also is suitably secured to the mounting plate.

The pin assembly 31 of the heating unit 28 includes a plurality of vertically disposed heat storage and transfer pins 68 of heat conductive material, one for each of the leads 16 to be reflow soldered, and mounted for vertical movement through apertures in the heater block 57. As is best shown in FIG. 2, when the pin assembly 31 is in its upper position the lower portions of the pins 68 are disposed in the apertures in the heater block 57 and surrounded by portions thereof, and heat flows, or is transferred from the heater block into the lower portions of the pins. While the pins 68 are heat conductive, since the area above the heater block 57 is relatively open, the portions of the pins above the heater block tend to remain relatively cool as the result of normal air circulation therethrough, although auxiliary cooling thereof, such as an air stream, may be provided if so desired. Accordingly, the pins 68 absorb discrete quantities of heat from the heater block 57, depending on its temperature and the mass of the pins which are disposed in its apertures.

Preferably, the pins 68 are of a material which will not readily wet to the solder 21, such as certain tool steels. In the alternative, the pins 68 may be of a solder-wettable material, having non-wettable tips on their lower ends. The pins 68 also may be of different diameters and shapes, depending on the relative physical characteristics of their respective leads 16, and may be composite members having heat storage portions of any desired heat conductivity and heat absorbing capacity at their lower ends and having upper portions formed of low or non-heat conductive material.

Figure 8:
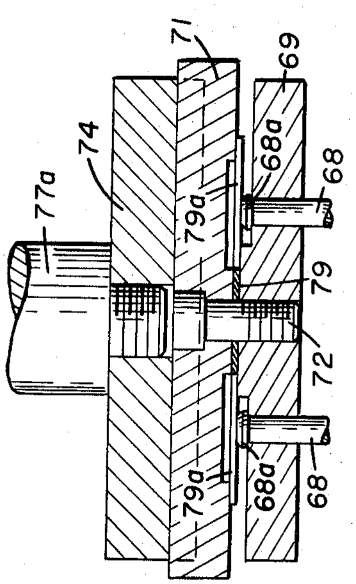
FIG. 8 is a cross-sectional view taken along the line 8—8 in FIG. 7.
Figure 6:
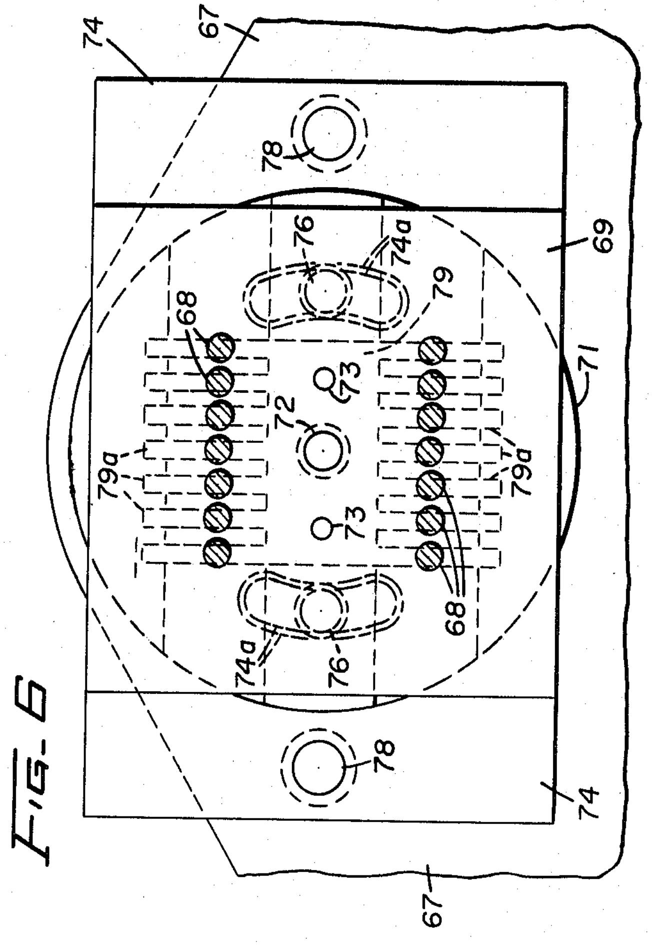
FIG. 6 is a further enlarged cross-sectional view taken along the line 6—6 in FIG. 3.
Figure 7:
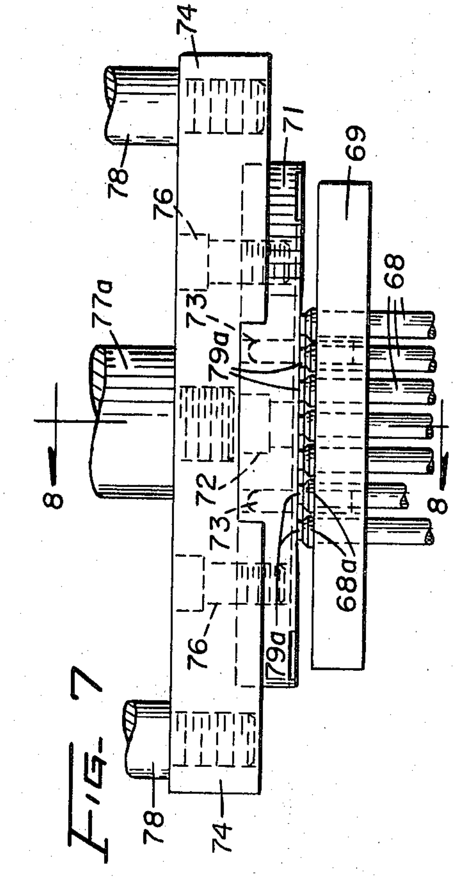
FIG. 7 is a front elevational view of the portion of the apparatus shown in FIG. 6.

Referring to FIGS. 6, 7 and 8, the upper ends of the heat storage and transfer pins 68 are mounted in apertures in a rectangular pin holding member 69 which is provided with depressed shelf portions on either side of an upwardly projecting central portion (best shown in FIG. 8), to accommodate heads 68a of the pins. The pin holding member 69 is secured to a circular first mounting plate 71 by a screw 72 and a pair of dowel pins 73 located in aligned apertures in the pin holding member and the mounting plate. The circular mounting plate 71 is secured in a circular recess in the bottom of a rectangular second mounting plate 74 by screws 76 which are threaded into the circular mounting plate, and which have upper head and shank portions disposed in stepped arcuate slots 74a (FIG. 6) in the rectangular mounting plate, to permit adjustment of the circular mounting plate about its vertical axis. The rectangular mounting plate 74 is screw threadably mounted on the lower end of a piston rod 77a of an air cylinder 77 and vertically extending guide rods 78 are screw threaded to the rectangular mounting plate adjacent its opposite sides.

Each of the heat storage and transfer pins 68 is individually spring-biased downward by a resilient backing plate 79 positioned between the pin holding member 69 and the circular mounting plate 71 and held in place by the screw 72 and the dowel pins 73, which extend through apertures therein. The backing plate 79 includes a body portion having a plurality of resilient fingers 79a projecting from opposite sides thereof, with each finger being engaged with the head 68a of a respective one of the heat storage and transfer pins 68. Above the resilient fingers 79a, longitudinally extending slots (best shown in FIG. 8) are provided in the bottom of the circular mounting plate 71 so that the resilient fingers bridge across the slots and are capable of slight upward flexing movement when pressure is applied thereto by the pins.

FIGS. 10A and 10B illustrate the manner in which one of the heat storage and transfer pins 68 accomplishes the bonding of its respective lead 16 to one of the circuit paths 18 on the printed wiring board 19. In this connection, as is shown in FIG. 10A, prior to the pin 68 engaging the lead 16, as a result of the solder 21 on the lead and/or the resiliency in the lead, the lead is spaced above the circuit path 18. Then, when the pin 68 engages the lead 16, the heat in the lower portion of the pin flows into the solder 21 on the lead and causes it to melt and flow as illustrated in FIG. 10B, with the pin pressing the lead downward into firm engagement with the circuit path 18. As the heat in the solder 21 is dissipated, the pin 68 remains in pressure engagement with the lead 16 so that as the solder resolidifies, a proper bond of the lead to the circuit path 18 is achieved.

Referring to FIGS. 2 and 3, the air cylinder 77 for reciprocating the pin assembly 31 vertically is supported on the horizontally projecting shelf 67, which is secured to the front of the vertical mounting plate 64, with the piston rod 77a of the cylinder extending through an aperture in the shelf. The guide rods 78 of the pin assembly 31 also slidably extend through apertures in the shelf 67 and are provided with sets of vertical adjusting nut members 81 adjacent their upper ends.

As is best shown in FIGS. 2 and 4, the vertical mounting plate 64 of the heating unit 28 is releasably mounted on the vertical frame plate 53 of the main frame assembly 29, so that the entire heating unit readily can be removed from the apparatus and replaced with another heating unit for the reflow soldering of an integrated circuit module (such as the module 23 in FIG. 1) of a different type and configuration to the printed wiring board 19. In this connection, in the illustrated embodiment of the invention the vertical mounting plate 64 is provided with a vertically extending tongue portion which is slidably received in a slot in a support member 82 secured to the vertical frame plate 53 by suitable screws, and the vertical mounting plate is held in the slot by quick-releasable locking pin assemblies 83 mounted on opposite sides of the support member.

As noted hereinabove above, the main frame assembly 29 is mounted for movement in an X-Y coordinate system to facilitate proper positioning of the orienting nest 26, the feed mechanism 27 and the heating unit 28 relative to the printed wiring board 19 for a reflow soldering operation. In this connection, referring to FIG. 1, the vertical frame plate 53 of the main frame assembly 29 has its lower edge secured, as by welding, to a horizontal plate member 84, upon which the orienting nest 26 is mounted. The horizontal plate member 84 has guide bushings 86 (only one shown) secured to its underside and slidably mounted on a pair of horizontally spaced guide shafts 87 (only one shown) extending in an X direction, with each of the guide bushings being provided with a suitable locking screw. The ends of the guide shafts 87 are fixedly mounted in support blocks 88 (only one shown), each integral with a guide bushing 89 which is slidably mounted on a respective guide shaft 91 extending in a Y direction, with each of the second bushings also including a releasable locking screw. Opposite end portions of each guide shaft 91 are mounted in right-angle brackets 92 (only one shown) secured to the support table 37.

FIG. 11 discloses a modified form of the invention for reflow soldering a circuit module 17' having leads 16' on all four sides thereof. As in the apparatus disclosed in FIGS. 1–9, the modified form of the invention includes an appropriate number of heat storage and transfer pins 68' (illustrated schematically by broken lines), one for each of the leads 16', and a suitably modified heater block 57' and pin assembly (not shown) to accommodate the additional pins required. In this regard, a cartridge heater 58' is mounted in the heater block 57' on the diagonal so as not to interfere with the heat transfer and storage pins 68'. In addition, it is seen that a vacuum pickup device 38' must have a rigid tubular member 41' of angular construction such that it can extend through a gap between two adjacent rows of the pins 68', as illustrated in FIG. 11, so that the vacuum pickup device can remain in engagement with the circuit module 17' to hold it in position as the pins are lowered during a reflow soldering operation.

Figure 12A:
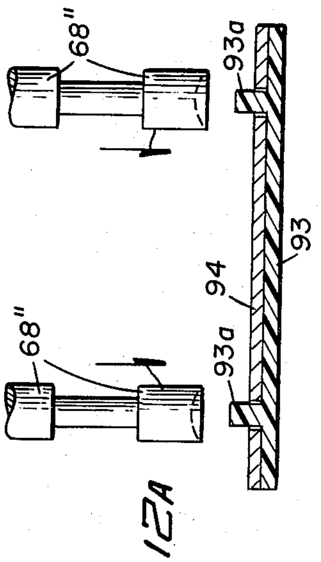
FIGS. 12A and B are views illustrating another modification of the invention.
Figure 12B:
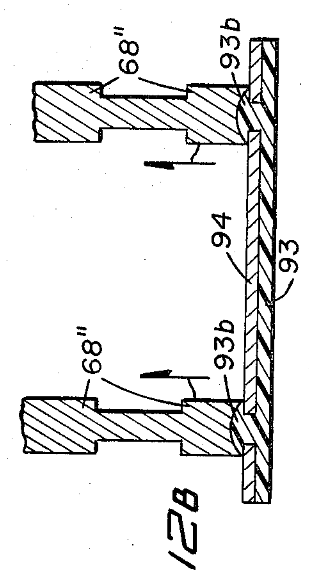

FIGS. 12A and 12B illustrate an embodiment of the invention for the securing of a first member 93 to a second member 94 by a staking operation. In this connection, the first member 93, which may be of a heat flowable material, such as plastic, includes projections 93a which extend upward through apertures in the second member 94, and modified heat storage and transfer pins 68'' are provided, with the lower end of each pin being concave upward and with the lower portion of each pin being a heat storage portion which is separated from the remainder of the pin by a restricted neck portion.

Initially, the pins 68'' are located in upper positions (not shown) with their storage portions disposed in apertures in a heater block (not shown) at a suitable temperature, such as 350°F. As the pins 68'' then are moved downward with discrete quantities of heat in their storage portions and engage the projections **93*a* on the first member, the heat in the storage portions flows into the projections, causing them to melt momentarily. During the melting and subsequent resolidification of the projections 93*a*, the concave portions of the pins 68'' form the projections to produce retaining heads 93*b* for securing the first member 93 to the second member 94, as illustrated in FIG. 12B, after which the pins may be raised back to their upper positions. During the staking process, the narrow neck portion of each pin 68'' reduces the tendency for additional heat to flow down the pin into its storage portion and formed head 93*b* so as to prevent the head from resolidifying properly. In this regard, instead of being provided with a restricted neck portion, each pin 68'' could be of composite construction having a storage portion of any desired heat conductivity and heat absorbing capacity at its lower end and having its upper portion formed of a low or non-heat conductive material, as noted hereinabove. Further, it is apparent that the physical shape of the lower end of each pin 68'' could be varied as necessary, depending on the desired shape of the projection 93*a*** or other article being processed.

OPERATION

In preparing for a reflow soldering operation, referring to FIG. 1, the integrated circuit module 17 is placed in the orienting nest 26, and the printed wiring board 19 is placed in its support assembly 24 on the bed of loosely constrained steel balls 32 and clamped in position by the spring-biased clamp assemblies 34. In this connection, as the printed wiring board 19 is placed on the steel balls 32, the downwardly projecting leads 22a of the components 22 exert forces on the balls causing them to move laterally in the tray 33 into engagement with portions of the wiring board between the components, whereby the steel balls support the wiring board firmly and uniformly over its entire area.

The apparatus then is actuated, whereupon the feed mechanism 27 transfers the circuit module 17 from the orienting nest 26 into position on the printed wiring board 19 beneath the pin assembly 31 of the heating unit 28, as illustrated by the dashed lines in FIG. 1, and so that the leads 16 of the circuit module are vertically adjacent their respective circuit paths 18, as illustrated in FIG. 9. More specifically, vacuum is applied to the vacuum pickup device 38, and the slide 44 upon which it is mounted is lowered by the air cyliner 48 so that its vacuum cup 39 engages the circuit module 17 in the nest 26. The air cylinder 48 then raises the slide 44 and the vacuum device 38 to lift the circuit module 17 vertically out of the nest 26, whereupon the air cylinder 56 is energized to move the slide 49 horizontally toward the heating unit 28. When the slide 49 reaches the end of its horizontal travel, as determined by a suitable stop, the air cylinder 48 is again actuated to lower the circuit module 17 vertically onto the printed wiring board 19, where the circuit module then is held in position by the vacuum cup 39.

During operation of the apparatus, the heater block 57 is maintained at a constant preselected temperature by the cartridge heater 58 and the heat controller 61. Thus, when the pin assembly 31 of the heating unit 28 is in its upper position as shown in FIGS. 1 and 2, in which the lower portions of the heat storage and transfer pins 68 are disposed in the apertures in the heater block 57, heat flows from the heater block into the lower portions of the pins. Since the area above the heater block 57 is relatively open, the portions of the pins 68 above the heater block remain relatively cool as the result of normal air circulation therethrough, or as the result of auxiliary cooling, not shown. Accordingly, after a certain time period, such as five seconds, the lower portions of the pins 68 will reach equilibrium and will have absorbed discrete quantities of heat, depending upon the temperature of the heater block 57 and the mass of the pins disposed within the apertures in the heater block.

When the circuit module 17 is initially placed on the printed wiring board 19 by the feed mechanism 27, the lead 16, as a result of the solder 21 thereon and/or the resiliency of the leads, will be in spaced relationship to their respective circuit paths 18, as illustrated in FIG. 10A. However, when the air cylinder 77 then is energized and moves the pin assembly 31 downward to its lower position, as shown in FIGS. 3 and 9, the lower ends of the heat storage and transfer pins 68 engage the solder 21 on respective ones of the leads 16 and press them firmly against their associated circuit paths 18. The discrete quantities of heat in the lower portions of the pins 68 then flow into the solder 21, causing the solder to melt and flow momentarily, as illustrated in FIG. 10B. In this regard, the movement of the pin assembly 31 to its lower position has the effect of interrupting the production of heat in the lower portions of the pins 68, the distance from the lower ends of the pins 68 to the heater block 57 then being such that, taken with the fact that the space between the lower ends of the pins and the heater block is relatively open, insufficient heat is able to flow from the heater block and down the pins to the leads 16 before the solder 21 has resolidified. Further, since during the melting and subsequent resolidification of the solder 21 the pins 68 are individually biased into engagement with their respective leads 16 by the resilient fingers 79*a* of the backing plate 79 (shown in FIGS. 6, 7 and 8), each lead becomes properly bonded to its respective circuit path 18, as illustrated in FIG. 10B.

After resolidification of the solder 21, the air cylinder 77 is reversed to return the pin assembly 31 to its upper position in FIG. 1 for the next cycle of operation. The vacuum pick-up device 38 then is deenergized and returned to its original position by the air cylinders 48 and 56, whereupon the printed wiring board 19 can be removed, with the circuit module 17 bonded thereto, from its support assembly 24.

The operation of the embodiment of the invention shown in FIG. 11 is identical to that described above for the apparatus in FIGS. 1 and 9, and therefore further discussion of the embodiment of FIG. 11 is not necessary.

In the embodiment of the invention shown in FIGS. 12A and 12B, which illustrate the invention as applied to the securing of the member 93 to the member 94 in a staking operation, the heat storage and transfer pins 68'', having discrete quantities of heat in the lower heat storage portions thereof, are moved from upper positions (not shown) downward to engage the projections 93*a* on the member 93. The heat in the lower storage portions of the pins 68'' then flows into the projections 93*a*, causing them to melt and to flow momentarily. During the melting and flowing of the projections 93*a*, the concave lower ends of the pins 68'' form the projections to produce the heads 93*b* on the member 93, as illustrated in FIG. 12B, to secure the member 93 to the member 94. At the same time the restricted neck portions of the pins 68'' reduce the tendency for additional heat to flow down the pins into the lower storage portions of the pins, so as to prevent the heads 93*b* from resolidifying properly. After the heads 93*b* have resolidified, the pins 68'' may be returned to their upper positions for the next cycle of operation.

What is claimed is:

1. The method of simultaneously securing a plurality of spaced members to an article with a heat storing means, which comprises:

producing a preselected quantity of heat which is sufficient to melt material adjacent each of the spaced members momentarily, and transferring the heat to the heat storing means at a position removed from the members and the article;

interrupting the transfer of heat to the heat storing means at the removed position;

then moving the heat storing means away from the removed position of heat transfer and engaging the heat storing means with the spaced members simultaneously so that the preselected quantity of heat in the heat storing means flows into the material adjacent the members to melt the material momentarily;

maintaining the heat storing means in pressure engagement with the members to hold the members in proper position relative to the article until the melted material adjacent the members has resolidified to secure the members to the article; and removing the heat storing means from the members after the melted material adjacent the members has resolidified to secure the members to the article.

2. The method of simultaneously securing a plurality of spaced members to an article with a heat storing means, wherein the article has a plurality of irregular protrusions on one side thereof, which comprises:

placing the side of the article having the irregular protrusions on a single-layer bed of loosely constrained, spherical members;

exerting pressure on the article to cause the loosely constrained, spherical members to move laterally away from the protrusions on the article and into supporting engagement with only portions of the article between the protrusions;

producing a preselected quantity of heat which is sufficient to melt material adjacent each of the spaced members momentarily, and transferring the heat to the heat storing means at a position removed from the members and the article;

interrupting the transfer of heat to the heat storing means at the removed position;

then moving the heat storing means away from the removed position of heat transfer and engaging the heat storing means with the spaced members simultaneously so that the preselected quantity of heat in the heat storage means flows into the material adjacent the members to melt the material momentarily;

maintaining the heat storing means in pressure engagement with the members to hold the members in proper position relative to the article until the melted material adjacent the members has resolidified to secure the members to the article; and removing the heat storing means from the members after the melted material adjacent the members has resolidified to secure the members to the article.

3. The method of simultaneously securing a plurality of spaced members to an article with a plurality of heat storing means, which comprises:

producing preselected discrete quantities of heat which are sufficient to melt material adjacent respective ones of the members momentarily, and transferring the discrete quantities of heat to respective ones of the plurality of heat storing means at a position removed from the spaced members and the article;

interrupting the transfer of heat to the plurality of heat storing means at the removed position;

then moving the plurality of heat storing means away from the removed position of heat transfer and engaging the plurality of heat storing means with respective ones of the spaced members simultaneously so that the preselected discrete quantities of heat in the heat storing means flow into the material adjacent the members to melt the material momentarily;

maintaining the plurality of heat storing means in pressure engagement with their respective members to hold the members in proper position relative to the article until the melted material adjacent the members has resolidified to secure the members to the article; and removing the plurality of heat storing means from the members after the material adjacent the members has resolidified to secure the members to the article.

4. Apparatus for simultaneously securing a plurality of spaced members to an article, which comprises:

heat storing means for storing a preselected quantity of heat sufficient to melt material adjacent each of the spaced members momentarily upon said heat storing means being moved into engagement with the members;

means for producing the preselected quantity of heat and transferring the preselected quantity of heat to said heat storing means at a position removed from the members and the article;

means for interrupting the transfer of heat to said heat storing means at the heat producing and transfer position;

means for moving said heat storing means away from said heat producing and transfer means into engagement with the spaced members so that the preselected quantity of heat in said heat storing means flows into material adjacent the members and causes the material to melt momentarily;

means for maintaining said heat storing means in pressure engagement with the members to hold the members in proper position relative to the article until the melted material adjacent the members has resolidified to secure the members to the article; and means for moving said heat storing means from the members after the melted material adjacent the members has resolidified to secure the members to the article.

5. Apparatus for simultaneously securing a plurality of spaced members to an article, which comprises:

a plurality of individual heat storing means, one for each of the spaced members;

means for producing preselected discrete quantities of heat and transferring the preselected quantities of heat to respective ones of said heat storing means at a position removed from the members and the article, each of the preselected quantities of heat being sufficient to melt material adjacent one of the members momentarily upon its respective heat storing means being moved into engagement with the member;

means for interrupting the transfer of heat to said plurality of heat storing means at the heat producing and transfer position;

means for moving said plurality of heat storing means away from said heat producing and transfer means into engagement with their respective members simultaneously so that the preselected quantities of heat in said heat storing means flow into material adjacent the members and cause the material to melt momentarily;

means for maintaining said plurality of heat storing means in pressure engagement with their respective members to hold the members in proper position relative to the article until the melted material adjacent the members has resolidified to secure the members to the article; and means for removing the plurality of heat storing means from their respective members after the melted material adjacent the members has resolidified to secure the members to the article.

6. Apparatus for simultaneously securing a plurality of spaced members to an article, as recited in claim 4, in which the plurality of members are located along respective sides of a carrying member, which further comprises:

means for feeding the carrying member and the plurality of members thereon relative to said heat storing means and into position adjacent the article in oriented relationship with respect to the article, said feeding means subsequently holding the carrying member and the plurality of members in their oriented relationship with respect to the article during the securing of the members to the article.

7. Apparatus for simultaneously securing a plurality of spaced members to an article, as recited in claim 4, in which:

said heat producing and transfer means includes a heater block having a plurality of apertures therethrough;

said heat producing and transfer means includes means for controlling the temperature of said heater block at a preselected constant value; and said heat storing means includes a plurality of elgonated pins disposed in the apertures in said heater block and having end portions of heat conducting material, said pins being movable longitudinally in the apertures between positions in which the end portions of said pins are disposed in the apertures for the reception of preselected discrete quantities of heat from said heater block, and positions in which the end portions of said pins are engaged with respective ones of the members for securing of the members to the article.

8. Apparatus for simultaneously securing a plurality of spaced members to an article, as recited in claim 7, which further comprises:

individual resilient means for urging each of said pins into engagement with a respective member whereby the members are urged into firm engagement with the article independently of one another and in a substantially uniform manner.

9. Apparatus for simultaneously securing a plurality of spaced members to an article, as recited in claim 7, in which:

said pins include means for substantially precluding the flow of heat from said heater block to the end portions of said pins when the end portions are engaged with the members.

10. The method of simultaneously securing a plurality of spaced members to an article with a heat storing means, as recited in claim 1, which further comprises:

transferring the preselected quantity of heat to the heat storing means at a position removed from the members and the article by positioning the heat storing means adjacent a constant heat source;

interrupting the transfer of heat to the heat storing means by moving the heat storing means away from the constant heat source and toward the members and the article; and returning the heat storing means to a position adjacent the constant heat source after the material adjacent the members has resolidified to secure the members to the article.

11. The method of simultaneously securing a plurality of spaced members to an article with a heat storing means, as recited in claim 10, which further comprises:

transferring preselected discrete quantities of heat to respective ones of a plurality of heat storing means at a position removed from the members and the article by surrounding each of the heat storing means with the constant heat source;

engaging the plurality of heat storing means with respective ones of the members so that the preselected discrete quantities of heat flow into the material adjacent the members to melt the material momentarily; and maintaining the plurality of heat storing means in pressure engagement with their respective members to hold the members in proper positions relative to the article until the melted material adjacent the members has resolidified to secure the members to the article.

12. The method of simultaneously securing a plurality of spaced members to an article, as recited in claim 11, which further comprises:

urging the plurality of heat storing means into engagement with the respective members independently of one another.

13. The method of simultaneously reflow soldering a set of relatively resilient leads projecting from a circuit module, to a set of leads on a circuit board, with a heat storing means, wherein at least one of the sets of leads has overlays of solder on the leads, which comprises:

feeding the circuit module relative to the heat storing means into a position on the circuit board in which the resilient leads of the circuit module are aligned with and superimposed on respective ones of the leads of the circuit board;

forcibly holding the circuit module against movement out of position with respect to the circuit board;

transferring a preselected quantity of heat to the heat storing means at a position removed from the aligned and superimposed leads of the circuit module and the circuit board, by positioning the heat storing means adjacent a constant heat source;

interrupting the transfer of heat to the heat storing means by moving the heat storing means away from the constant heat source toward the aligned and superimposed leads of the circuit module and the circuit board;

immediately engaging the heat storing means with the resilient leads on the circuit module so that the preselected quantity of heat in the heat storing means flows into the overlays of solder on the leads in the one set of leads to melt the solder momentarily;

maintaining the heat storing means in pressure engagement with the resilient leads of the circuit module to hold the leads in proper position relative to the leads on the circuit board until the melted solder has resolidified to secure the leads together;

removing the heat storing means from the relatively resilient leads of the circuit module after the melted solder has resolidified to secure the leads to the leads on the circuit board; and returning the heat storing means to a position adjacent the constant heat source.

14. The method of simultaneously reflow soldering a set of relatively resilient leads projecting from a circuit module, to a set of leads on a circuit board with a heat storing means, as recited in claim 13, wherein the leads are arranged in rows adjacent respective sides of the circuit module, which further comprises:

transferring preselected discrete quantities of heat to respective ones of a plurality of spaced heat storing means arranged in rows at a position removed from the aligned and superimposed leads of the circuit module and the circuit board, by surrounding each of the heat storing means with a constant heat source;

engaging the plurality of heat storing means with respective ones of the resilient leads of the circuit module so that the preselected discrete quantities of heat in the heat storing means flow into respective ones of the overlays of solder on the leads in the one set of leads to melt the solder momentarily; and maintaining the plurality of heat storing means in pressure engagement with their respective resilient leads on the circuit module to hold the leads in proper position relative to the leads on the circuit board until the melted solder has resolidified to secure the leads together.

15. The method of simultaneously reflow soldering a set of relatively resilient leads projecting from a circuit module, to a set of leads on a circuit board with a heat storing means, as recited in claim 14, which further comprises:

urging the plurality of heat storing means into engagement with their respective resilient leads on the circuit module independently of one another.

* * * * *